United States Patent [19]

Joshi

[11] Patent Number: 5,003,822
[45] Date of Patent: Apr. 2, 1991

[54] ACOUSTIC WAVE MICROSENSORS FOR MEASURING FLUID FLOW

[76] Inventor: Shrinivas G. Joshi, 4344 Regal Ct., New Berlin, Wis. 53151

[21] Appl. No.: 416,144

[22] Filed: Oct. 2, 1989

[51] Int. Cl.$^5$ .............................................. G01F 1/68
[52] U.S. Cl. ............................. 73/204.23; 73/204.15
[58] Field of Search ........... 73/204.14, 204.15, 204.23, 73/204.26

[56] References Cited

U.S. PATENT DOCUMENTS

| | | | |
|---|---|---|---|
| 4,478,076 | 10/1984 | Bohrer | 73/204.26 |
| 4,680,963 | 7/1987 | Tabata et al. | 73/204.23 |
| 4,726,255 | 2/1988 | Brace et al. | 73/204.23 |
| 4,932,255 | 6/1990 | Brace et al. | 73/204.11 |

OTHER PUBLICATIONS

Ahmad, "Surface Acoustic Wave Flow Sensor" presented IEEE Ultrasonics Symposium on 10/17/85.

Primary Examiner—Herbert Goldstein
Attorney, Agent, or Firm—Andrus, Sceales, Starke & Sawall

[57] ABSTRACT

The use of a surface acoustic wave (SAW) device to measure rate of fluid flow. A SAW oscillator heated to a suitable temperature above ambient is placed in the path of the flowing fluid. Convective cooling caused by fluid flow results in a change in the oscillator frequency. A 73 MHz oscillator fabricated on 128° rotated Y-cut lithium niobate substrate and heated to 55° C. above ambient shows a frequency variation greater than 142 kHz for flow rate variation from 0 to 1000 cm$^3$/min.

18 Claims, 4 Drawing Sheets

FIG. 1

ACOUSTIC WAVE MICROSENSORS FOR MEASURING FLUID FLOW

BACKGROUND AND SUMMARY OF THE INVENTION

The present invention generally relates to the field of flow sensors, and more particularly to flow sensors based on the use of acoustic waves.

The measurement and control of fluid flows is fundamental to many scientific and technological areas. Numerous methods for measuring flow are available. These include a number of mechanical devices such as variable area flow meters, pitot tubes, and turbine meters; a variety of ultrasonic flowmeters; and laser doppler shift devices. The most commonly used flow measurement device today is the hot wire anemometer (HWA). The HWA consists of a small, electrically heated element exposed to the fluid for the purpose of measuring fluid velocity. Flow of fluid carries heat away by convection. This results in a change in the temperature and hence in the resistance of the element. The change in resistance is usually measured by using the element as one of the arms of a Wheatstone bridge. The measured offset voltage of the bridge is proportional to fluid velocity. Although the theoretical aspects of HWA's have advanced significantly, practical difficulties in using these devices continue. The problems include those associated with the electronics, probe stability, calibration, and frequent breakage of the fragile filament. Also, the device is not suitable for large scale mass production. The hot film anemometer (HFA) is another commonly used flow measurement device which employs the same principle as the HWA. Many of the problems associated with the HWA also occur in the hot film anemometer. In recent years there has been a growing interest in developing highly sensitive, miniature flow sensors based on semiconductor and other solid state phenomena. Examples of such sensors reported in the literature include a lithium tantalate pyroelectric anemometer and a variety of silicon based devices.

In general, commercially available flow sensors for air and other gases commonly use large components, typically in a configuration with a flow tube having a heated section and adjacent upstream and downstream temperature detector sections. Such instruments use relatively large flow rates, require large power inputs, and are not small enough and sufficiently sensitive for many applications of interest. A need exists for a flow sensor that is small in size, consumes low power, has high sensitivity, and fast response. In addition, the device must be mass producible on a large scale and be low in cost. The literature contains several examples of attempts to improve the flow sensing art with respect to these needs. As previously noted, a number of flow sensors using silicon and its semiconducting properties have been reported, and the use of a pyroelectric material to measure flow has also been considered.

The present invention is concerned with the use of acoustic wave devices for measuring gas flow. The discussion will mainly deal with the use of surface acoustic waves (SAW's). However, the basic techniques described here can also be used with other types of acoustic waves such as plate waves or Lamb waves, surface skimming bulk waves (SSBW), reflected bulk waves (RBW), etc. The basic device used is a delay-line or resonator stabilized SAW oscillator which is heated to a suitable temperature above ambient. Flow of gas over the device carries heat away by convection. This lowers the substrate temperature thereby causing change in the oscillator frequency.

Two previous reports on the use of surface acoustic waves to measure gas flow are known. The first is an article by Nisar Ahmad, presented at the 1985 IEEE Ultrasonics Symposium, Oct. 1985 entitled "Surface Acoustic Wave Flow Sensor." The Ahmad device, however, has the following disadvantages: (1) the heater is situated outside the delay line resulting in poor heating; (2) the size of the device is increased because of the area needed for the heater; and (3) the SAW delay line used by Ahmad can support several modes of oscillation which can cause ambiguity in the output of the device. Additionally, the response of Nisar's flow sensor is very poor. In particular, oscillator frequency shows almost no change for flow rate variation from 0 to 2,000 cm$^3$/min., and even after 2,000 cm$^3$/min., the sensitivity is very low, i.e. a fractional frequency change, $\Delta f/f$, of less than $8 \times 10^{-8}$ per cm$^3$/min. change in flow rate. Also, the device consumes relatively large heater power (greater than 1W).

Another approach using SAW as a flow sensor is the patent by Brace and Sanfelippo, U.S. Pat. No. 4,726,225, issued Feb. 23, 1988. In this device, Brace and Sanfelippo do not use a separate heater. Instead they convert a fraction of the r.f. energy in the oscillator loop to heat. This device has the following disadvantages: (1) the power needed to heat the delay line has to be supplied by the r.f. amplifier which requires the use of an amplifier with large power output capability, thus making the amplifier expensive; and (2) heating takes place only in the region of the acoustic absorbers. Thus heating is only produced at certain localized regions of the substrate. This can cause nonuniform substrate temperature distribution, unless special arrangements are made to uniformly distribute the heat.

Theoretical analysis of flow sensor operation shows that to obtain a sensor with high sensitivity and fast response the following are needed: (1) efficient heating of SAW propagation path, (2) good thermal isolation between substrate and ambient, (3) a device with small mass, and (4) a substrate with a large temperature coefficient of delay.

Accordingly, the present invention provides a number of improved designs to meet the above goals. More particularly, the SAW flow sensor devices of the present invention locate the heater directly in the propagation path of the delay line. This results in efficiently heating the delay line and further no separate area for the heater is needed. Also there is obtained a very sensitive device. For example, in one device constructed in accordance with the invention, the value of $\Delta f/f$ for 1 cm$^3$/min. change in flow rate is greater than $1.9 \times 10^{-6}$. This is achieved with a heater power of less than 85 mW.

DESCRIPTION OF THE PREFERRED EMBODIMENTS

Figure 1:
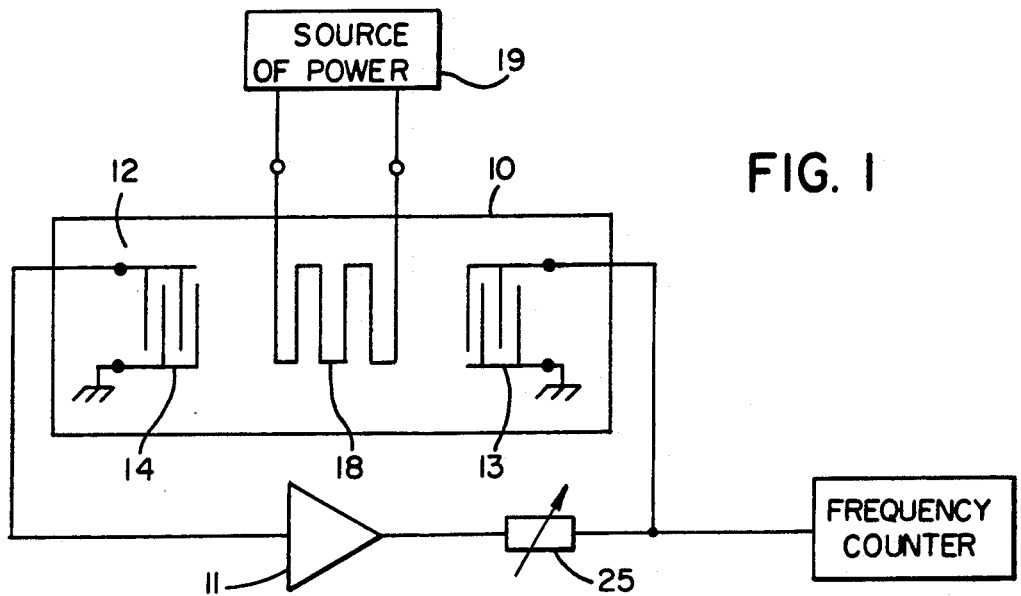
FIG. 1 is a block diagram of a surface-acoustic-wave (SAW) flow sensor constructed in accordance with one embodiment of the present invention.

The block diagram of a flow sensor constructed in accordance with the present invention is shown in FIG. 1. It consists of a surface acoustic wave (SAW) delay line 10 heated to a suitable temperature above ambient. The delay line 10 is connected in the feedback path of an amplifier 11 resulting in a delay-line stabilized SAW oscillator. The device 10 includes a substrate 12, an input transducer 13, and output transducer 14 and a heater element 18 disposed between transducers 13 and 14 and connected to a source of power 19. The device 10 is mounted in a test-cell (see FIG. 2(b)) and placed in the path of the flowing gas. Flow of fluid over the device carries heat away by convection. This lowers the substrate temperature thereby causing change in the time delay and hence in the oscillator frequency. Transducers 13 and 14 may be of the interdigital, comb or wedge type or any other well known structures used for generating and detecting surface acoustic waves.

EXAMPLE 1

Figure 2A:
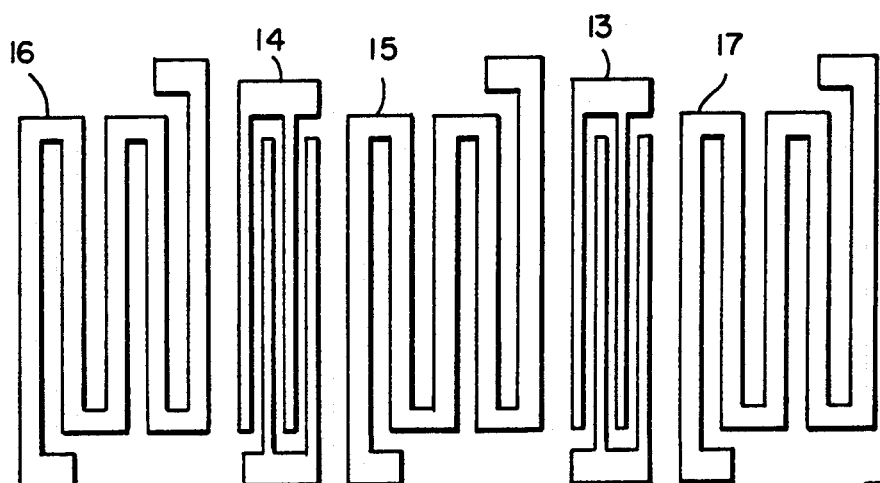
FIG. 2(a) is a schematic diagram of a SAW delay line illustrating thin film meander line heaters for the sensor of FIG. 1.

Referring again to FIG. 1, the present experiment utilizes a 73 MHz SAW delay line 10 fabricated on a 0.5 mm thick, 128° rotated Y-cut, X-propagating lithium niobate substrate 12. The input 13 and output 14 interdigital transducers (IDT's) consist of 15 and 30 finger pairs, respectively. The IDT's have a periodicity, p, of 52 $\mu$m and an aperture, W, of 1.4 mm. In order to support a single mode of oscillation, the spacing between transducers was set at 30 p. The untuned, unmatched insertion loss in a 50 ohm system was less than 8 dB. In FIG. 2(a), heater element 18 consists of thin-film meander line heaters 15, 16 and 17 fabricated on either side of the input 13 and output 14 IDT's as well as in the propagation path between the transducers. Note that in order to efficiently heat the SAW propagation path the heaters are placed directly in the propagation path itself. However, the heaters should not adversely affect the operation of the delay line 10. This is achieved by choosing the width of the heater electrodes and gap between them to be p/2 (or any integral multiple of p/2). With this design, the acoustic reflections from the heater electrodes are minimized. The heater situated between the IDT's consists of 7 electrodes, while each of the end heaters 16 and 17 consist of 9 electrodes. The electrode structure of the delay line 10 is shown in FIG. 2(a). The three heaters 15, 16 and 17 were connected in parallel. The resistance of the parallel combination at room temperature was 82 ohms.

Figure 2B:
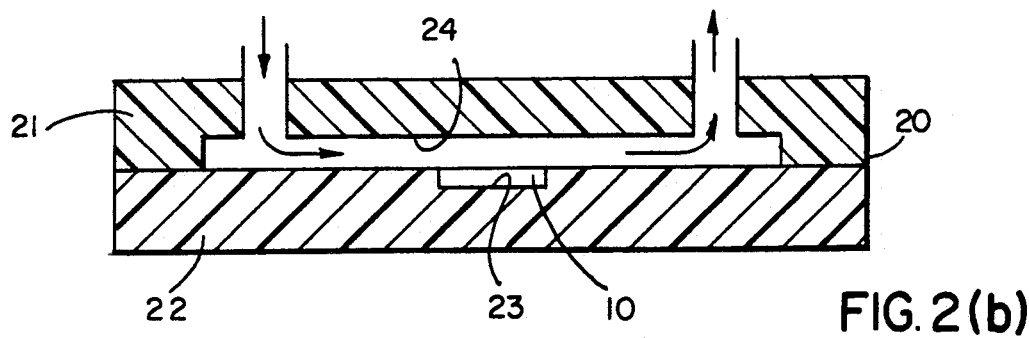
FIG. 2(b) is a cross-sectional view of a gas flow cell for mounting the sensor of FIG. 1.
Figure 3:
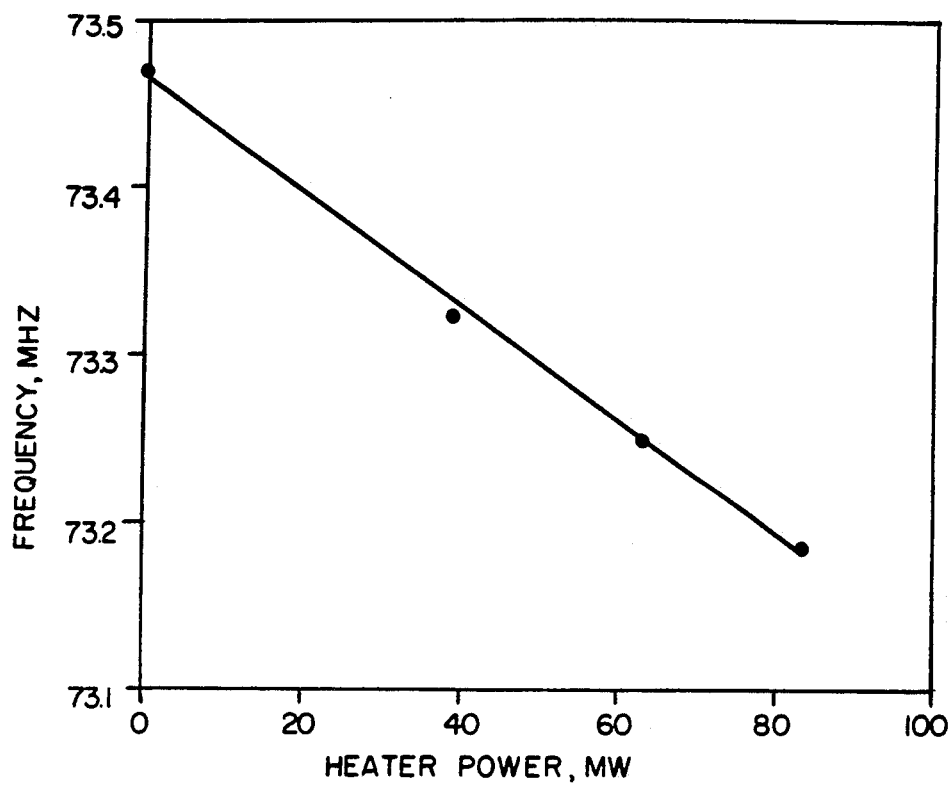
FIG. 3 is a graph of oscillator frequency in MHz versus heater power in mW for the sensor of FIG. 1.

The delay line 10 measuring 4 mm×5 mm×0.5 mm was mounted inside an airtight test cell 20. The cell 20 consists of two plastic plates, i.e. an upper plate 21 and a lower plate 22, each measuring 22 mm×5 mm×9 mm. The SAW device was placed on a 1.5 mm thick piece of shock absorbing foam (not shown) and mounted inside a 10 mm×6 mm×2 mm (deep) cavity 23 in the lower plate 22. A channel 24 10 mm wide×1.2 mm deep is milled into the upper plate 21. Gas flows through this channel. A cross sectional view of the cell 20 is shown in FIG. 2(b). A wide-band r.f. amplifier 11 (HP Model 462A) and a variable attenuator 25 completed the SAW oscillator loop. A constant current d.c. power supply 19 was used to supply power to the heaters 15-17. In order to determine $G_o$, the thermal conductance between substrate 12 and ambient under no gas flow, the variation of SAW oscillator frequency was measured as a function of heater input power. Results are shown in FIG. 3. It should be noted that oscillator frequency decreases linearly with heater power, with a variation of more than 282 kHz for input power of 83 mW. The temperature coefficient of frequency (TCF) for 128° Y-X LiNbO₃ is −69 ppm/° C. For an oscillator operating at 73.468 MHz, this corresponds to a frequency decrease of 5.069 kHz/° C. From the slope of FIG. 3, it is determined that the thermal conductance, $G_o$, is equal to 1.492 mW/° C.

Figure 4:
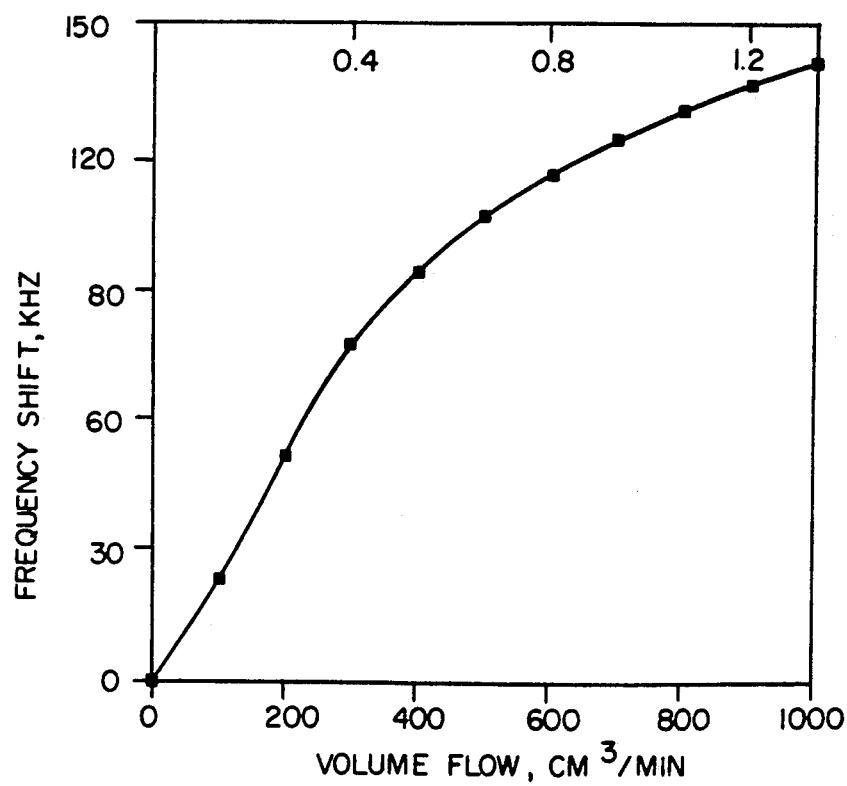
FIG. 4 is a graph of oscillator frequency shift in kHz versus volume flow rate of dry nitrogen gas in cm³/min. with the horizontal axis also showing the average flow velocity in m/s for the sensor of FIG. 1.

In order to study the performance of the device as a flow sensor, the test cell 20 containing the SAW device 10 was connected to a source of dry nitrogen gas. The cell was placed in series with a conventional mass-flow meter (Linde, Model FM 4584). Flow of gas cools the SAW device thereby increasing oscillator frequency. Measurements of oscillator frequency versus gas flow rate were carried out for various values of heater input current. FIG. 4 shows a plot of change in oscillator frequency versus gas flow rate for a heater current of 31 mA. This current corresponds to heater input power, $P_H$, of approximately 83 mW. The frequency shift is greater than 142 kHz for variation in flow rate from 0 to 1,000 cm³/min. The horizontal axis of FIG. 4 also shows the average gas flow velocity, $v_f$. For the channel dimensions of 10 mm ×1.2 mm used in this device, it varies from 0 to 1.389 m/s for volume flow rate variation from 0 to 1,000 cm³/min. The flow rate was cycled several times over the range of 0 to 1,000 cm³/min. The variation of frequency versus flow rate was repeatable to within ±4 kHz.

The smallest change in flow that can be detected is limited by the short-term stability of the SAW oscillator. SAW delay line oscillators with short-term stabilities better than 1 part in 10⁹ are known. As a conservative FIGURE, if one assumes short-term stability of 1 part in 10⁷, it means that fractional frequency changes down to 1 part in 10⁷ can be resolved. FIG. 4 shows that the average value of Δ f/f for 1 cm³/min. change in flow rate is $1.93 \times 10^{-6}$. Thus, the present device can resolve changes in flow rate of nearly 0.05 cm³/min. This corresponds to a resolution of $5 \times 10^{-5}$ of the full scale reading. To obtain the same resolution, a sensor with analog output will have to use an A-to-D converter with greater than 14 bits of resolution.

Figure 5:
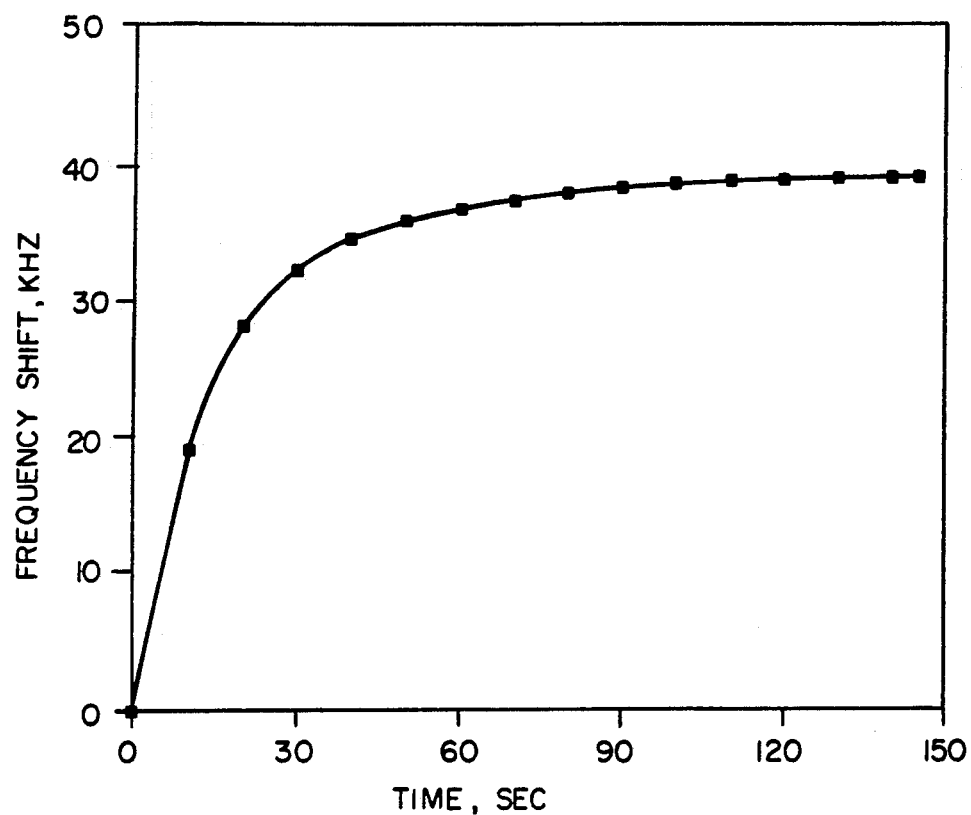
FIG. 5 is a graph of the response of the sensor of FIG. 1 to a step increase in flow rate from 0 to 200 cm³/min.
Figure 6A:
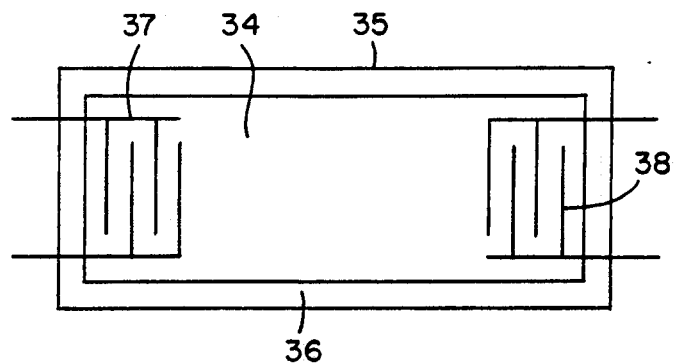
FIG. 6(a) is a plan view of a second embodiment of a SAW device in accordance with the present invention.
Figure 6B:
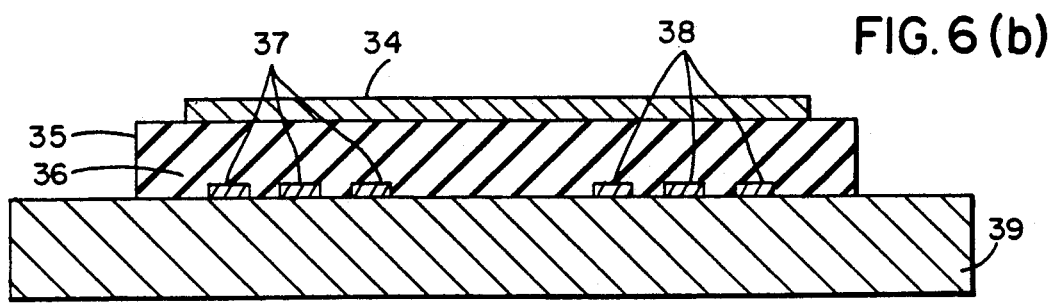
FIG. 6(b) is a cross-sectional view of the device of FIG. 6(a)

The response of the sensor to a step change in flow is shown in FIG. 5. Here the flow rate was varied in nearly step fashion from 0 to 200 cm$^3$/min. The response is well represented by a time constant, $\tau$, of approximately 17 s. $\tau$ can be calculated from the equation $\tau = mC/G_{eff}$. Using $\rho = 4.64 \times 10^3$ kg/m$^3$, $C = 645$ J/kg°K, and $G_{eff} = G_o = 1.492$ mW/°C., we get $\tau = 20$ s, indicating fair agreement between measured and calculated values.

The flow sensor described here is essentially a SAW oscillator whose frequency is modulated by fluid flow. Attractive features of this sensor are the following: (1) it has high sensitivity and wide dynamic range. Comparison with existing solid-state flow sensors shows that the SAW flow sensor will potentially have higher sensitivity and wider dynamic range than state-of-the-art devices available today; (2) since frequencies can be measured precisely, the device has high accuracy; (3) it provides a direct digital output which can be conveniently interfaced with microprocessors and microcomputers, and (4) the device can be mass produced using the well established integrated circuit fabrication technology.

EXAMPLE 2

Device geometries that can be used to improve sensor performance are shown in FIGS. 6 through 9. The device used in Example 1 has the drawback that the region occupied by the transducers 13 and 14 is not directly heated. This can be overcome by using the arrangement shown in FIGS. 6(a) and 6(b). In this case the heater consists of a rectangular strip 34 of a suitable resistive material which is used to heat the entire delay line 35. A thin film 36 of a suitable insulating material is interposed between the delay line 35 on substrate 39 and the heater 34 to prevent electrical shorting of the IDT's 37 and 38. Candidate materials for the insulating layer 36 are SiO, SiO$_2$, polymide, etc., while the heater 34 could be made from nichrome, titanium, platinum-iridium alloy, etc. The TCF of this device will depend not only on the substrate material but also on the materials and thicknesses of the insulating layer and heater 34. Proper choice of material and thickness combination can give a TCF value appreciably greater than that of the substrate. As noted before, a higher TCF will give higher sensitivity.

EXAMPLE 3

Figure 7:
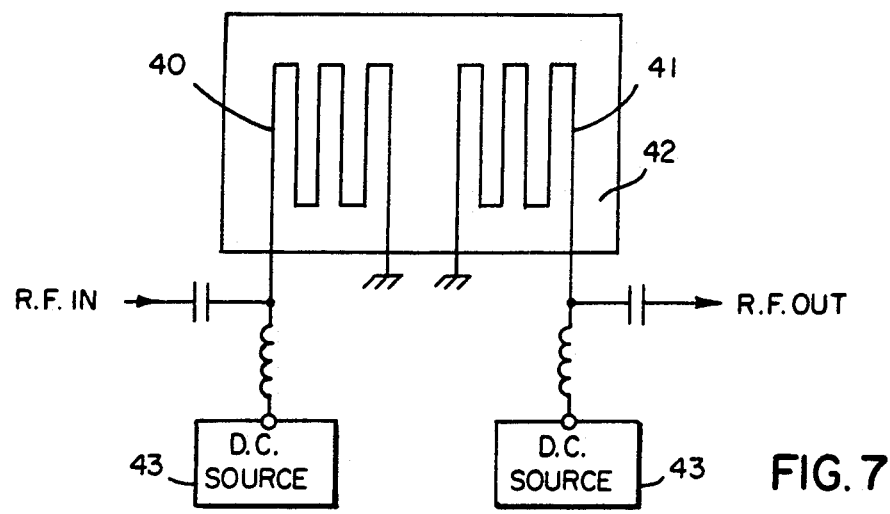
FIG. 7 is a plan view of a third embodiment of a SAW device in accordance with the present invention.

The device shown in FIG. 7 uses meander line transducers 40 and 41 on substrate 42 for both heating the delay line as well as for generating and detecting surface waves. This type of transducer requires a static magnetic field for its operation. The fingers of the transducer are subjected to a force (Lorentz force due to current flow in a magnetic field) and thereby produce deformation of the surface of substrate 42. This leads to the generation of an acoustic wave. As shown in FIG. 7, a source 43 of d.c. or very low frequency current is used to heat the delay line, while r.f. current flowing at the resonant frequency generates surface acoustic waves. Advantages of this device are: (a) no separate heater is required, and (b) the device can work on nonpiezoelectric substrates also.

EXAMPLE 4

Figure 8:
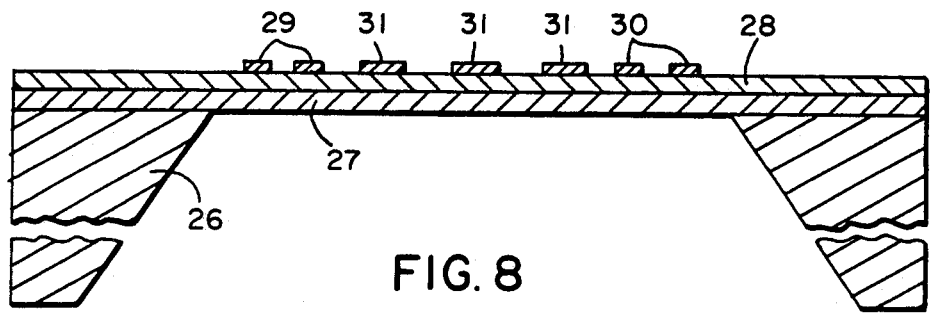
FIG. 8 is a cross-sectional view of a fourth embodiment of the flow sensor based on ultrasonic Lamb waves.

The theoretical analysis presented hereinbefore indicates that to obtain a sensor with high sensitivity and fast response time, the mass of the SAW device should be minimized. An attractive approach to reducing sensor mass is through the use of ultrasonic Lamb waves that propagate on thin membranes. One possible geometry for a flow sensor based on Lamb wave is shown in FIG. 8. Here a thin membrane 27 is fabricated in the silicon substrate 26. The membrane 27 could be made of silicon or silicon nitride. A thin film 28 of piezoelectric zinc oxide is sputtered on the membrane, and the IDT's 29 and 30 and heaters 31 are fabricated on top of the zinc oxide film 28. Assuming that the same IDT and heater structure as in FIG. 1 is used, the area needed for the membrane will be 3.67 mm $\times$ 1.4 mm. (Note that the IDT and heater contact pads can be located off the membrane). For a membrane thickness of 3 $\mu$m, the mass of this device will be less than that of our present device by a factor of 650, indicating that time constants of less than 20 ms can be achieved. Decreasing p, the IDT periodicity, will allow further reduction in the mass of the device. Besides faster response, this device also offers the following additional advantages: (1) by using the lowest order antisymmetric mode of propagation (the $A_o$ mode), the device operates at a frequency much lower than SAW resonant frequency, thus simplifying fabrication of the associated electronic circuitry; (2) use of the $A_o$ mode allows the device to operate even while immersed in a liquid medium; thus flow rates of liquids can also be measured; and (3) the associated electronics can be fabricated in the silicon substrate resulting in a fully integrated sensor.

EXAMPLE 5

Figure 9:
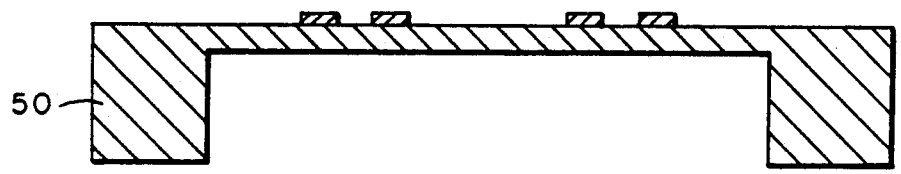
FIG. 9 is a cross-sectional view of a fifth embodiment of a SAW device in accordance with the present invention; and, FIG. 10 is a cross-sectional view of the SAW device of FIG. 1 for use in measuring liquid flow rate.

FIG. 9 illustrates a device similar to that of FIG. 8 except on a lithium niobate substrate 50. Since the substrate here is piezoelectric, there is no need to deposit a piezoelectric thin film for generation and detection of acoustic waves. The thermal conductivity of lithium niobate is only 1/20th that of silicon. Hence this device will have better thermal isolation than the device of FIG. 8, resulting thereby in higher sensitivity.

EXAMPLE 6

Figure 10:
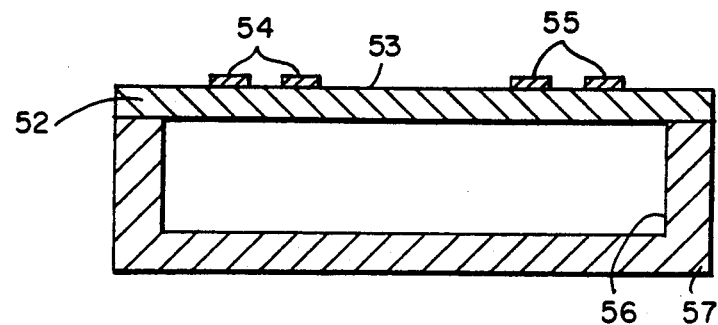

The examples up to this point have assumed that the sensing device is immersed in a flowing gas, rather than in a liquid. Since surface acoustic waves are severely damped in the presence of liquids, some modifications will be needed to measure liquid flow rates. One possible approach is shown in FIG. 10. Here the liquid flows through a channel 56 formed within a housing 57 having side walls that support substrate 52. As discussed before, heaters (not shown) are fabricated on the upper surface to heat the device. The liquid flows in contact with the lower surface 51 of substrate 52, while surface waves propagate on the upper surface 53 by means of transducers 54 and 55. The lower surface is not directly heated. However, since the substrate 52 is fairly thin, the temperature difference between the upper and lower surfaces is not too large. For example, consider a 0.5 mm thick LiNbO$_3$ device with an active, heated area of $5 \times 5$ mm$^2$. The thermal conductivity of LinbO$_3$ is $k = 4.2$ W/m°C., and hence the thermal resistance between the upper and lower surfaces is $R_{th} = 1/kA = (5 \times 10^{-4})/(4.2 \times 25 \times 10^{-6}) = 4.7°$ C/W. Thus for a heater input power of 200 mW, the lower surface 51 will be within 1° C. of the upper surface 53.

It should be noted that the devices of FIGS. 8 and 9 can directly measure liquid flow rates without any modification. This is because the velocity of the lowest antisymmetric mode is much less than velocity in many liquids. Hence, this mode will not be attenuated by the presence of the liquid.

In summary, a flow sensor based on the use of surface acoustic waves and Lamb waves has been described. The device is essentially a SAW oscillator whose frequency is modulated by fluid flow. The device basically senses velocity of the flowing fluid. With proper calibration, it can be used to measure (a) volume flow rate, (b) dynamic differential pressure, and (c) mass flow rate. High sensitivity, wide dynamic range, and direct digital output are amongst the attractive features of this sensor.

Various modes of carrying out the invention are contemplated as being within the scope of the following claims particularly pointing out and distinctly claiming the subject matter which is regarded as the invention.

I claim:

1. A surface acoustic wave device for measuring the flow rate of a gas or liquid, comprising:
    a surface acoustic wave delay line including a substrate having disposed on one of its surfaces a transmitting input transducer and a receiving output transducer spaced from said input transducer to form a propagation path therebetween;
    heater means for heating said substrate to a temperature higher than ambient, said heater means disposed on said substrate in said propagation path and having a geometry so as to minimize absorption and reflection of an acoustic wave propagating in said path; and
    a source of power for said heater means disposed externally of said delay line.

2. The device of claim 1 wherein said heater means comprises a thin film meander line having electrodes with a width of p/2 or an integral multiple of p/2 where p is the wavelength of the acoustic wave.

3. The device of claim 1 wherein said heater means comprises a film of resistive material.

4. A surface acoustic wave device for measuring the flow rate of a gas or liquid, comprising:
    a surface acoustic wave delay line including a substrate having disposed on one of its surfaces a transmitting input transducer and a receiving output transducer spaced from said input transducer to form a propagation path therebetween;
    heater means for heating said substrate to a temperature higher than ambient, said heater means disposed on said substrate in said propagation path, said heater means comprises a first heater disposed in said propagation path between said transducers, and second and third heaters disposed on either side of said input and output transducers; and
    a source of power for said heater means disposed externally of said delay line.

5. The device of claim 4 wherein said first, second and third heaters are each thin film meander lines.

6. The device of claim 4 wherein said substrate is composed of lithium niobate.

7. A surface acoustic wave device for measuring the flow rate of a gas or liquid, comprising:
    a surface acoustic wave delay line including a substrate having disposed on one of its surfaces a transmitting input transducer and a receiving output transducer spaced from said input transducer to form a propagation path therebetween;
    heater means for heating said substrate to a temperature higher than ambient, said heater means disposed on said substrate in said propagation path;
    a source of power for said heater means disposed externally of said delay line; and
    a thin film of insulating material interposed between said delay line and said heater means.

8. The device of claim 7 wherein said thin film completely covers said input and output transducers.

9. The device of claim 8 wherein said heater means comprises a strip of a resistive material of sufficient dimensions to heat the entire delay line.

10. A surface acoustic wave device for measuring the flow rate of a gas or liquid, comprising:
    a surface acoustic wave delay line including a substrate having disposed on one of its surfaces a transmitting input transducer and a receiving output transducer spaced from said input transducer to form a propagation path therebetween;
    heater means for heating said substrate to a temperature higher than ambient, said heater means disposed on said substrate in said propagation path;
    a source of power for said heater means disposed externally of said delay line; and
    wherein said input and output transducers each comprise thin film meander lines and said heater means comprising said input and output meander line transducers.

11. An acoustic plate wave device for measuring the flow rate of a gas or liquid, comprising:
    an acoustic plate wave delay line including a substrate having a thin membrane region, said thin membrane region is composed of a piezoelectric material and having disposed on one surface of said thin membrane region a transmitting input transducer and a receiving output transducer spaced from said input tranducer to form a propagation path therebetween;
    heater means for heating said thin membrane region to a temperature higher than ambient, said heater means disposed on said thin membrane region in said propagation path and having a geometry so as to minimize absorption and reflection of an acoustic wave propagating in said path; and
    a source of power for said heater means disposed externally of said delay line.

12. The device of claim 11 further including a piezoelectric film interposed between said delay line and said thin membrane.

13. The device of claim 12 wherein said piezoelectric film is composed of zinc oxide and said substrate is composed of silicon.

14. The device of claim 11 wherein said substrate is composed of lithium niobate.

15. The device of claim 11, wherein said heater means comprises a first heater disposed in said propagation path between said transducers, and second and third heaters disposed on either side of said input and output transducers.

16. The device of claim 15 wherein said first, second and third heaters are each thin film meander lines.

17. The device of claim 11 wherein the entire substrate is composed of a piezoelectric material.

18. A surface acoustic wave device for measuring the flow rate of a gas or liquid, comprising:
    a surface acoustic wave delay line including a substrate having disposed on one of its surfaces a transmitting input transducer and a receiving output transducer spaced from said input transducer to form a propagation path therebetween;
    heater means for heating said substrate to a temperature higher than ambient, said heater means disposed on said substrate in said propagation path;
    a source of power for said heater means disposed externally of said delay line; and
    wherein said delay line and said heater means is disposed on said one surface of said substrate and fluid contacts an opposite surface of said substrate.

* * * * *